Sept. 3, 1940.    C. J. WHITCOMBE    2,213,353

NUT

Filed May 5, 1939

Christopher John Whitcombe
Inventor

Patented Sept. 3, 1940

2,213,353

UNITED STATES PATENT OFFICE 2,213,353

NUT

Christopher John Whitcombe, Birmingham, England, assignor to Guest, Keen & Nettlefolds, Limited, Birmingham, England Application May 5, 1939, Serial No. 271,998
In Great Britain August 15, 1938

4 Claims. (Cl. 151—21)

Nuts which are not provided with any special means for locking or making them retain position when subject to vibration, depend for their ability to remain tight under vibration, upon the tightness with which they are screwed up. When such nuts are screwed against the work, the upper side of the thread in the nut presses against the lower side of the thread on the stem (assuming that the nut is screwed down on to the top of the work), and the factor which resists loosening under vibration is the friction between the upper side of the thread in the nut and the lower side of the thread on the stem and between the end face of the nut and the surface of the work.

Unfortunately, however, the tight screwing of the nut against the work cannot always be relied upon in industry. Owing to carelessness or inadvertence nuts are sometimes not screwed up tightly, and in such cases when subject to vibration, they quickly become loose. Further, in some cases the work recedes away from the nut as a result of its shrinkage or distortion, or as a result of some movement of another part to which the work is connected, or alternatively, the bolt may expand owing to a rise in temperature, and in either case the friction securing the nut in place may be insufficient to prevent the nut from becoming loose when subject to vibration.

Many proposals have been put forward for locking nuts positively to the stems upon which they are screwed, such proposals involving the carrying out of some work such as drilling on the stem, and making it necessary after the nut has been tightened to insert or in some way attach a locking member to the nut and stem, thus complicating the operation of placing the nut in position. The present invention is not concerned with such positive locking means.

It is also a common practice to place between the nut and the work a spring washer, and this practice is reasonably effective, but since a spring washer constitutes a separate part, this method of causing the nut to retain position is open to the disadvantage that through inadvertence or carelessness the spring washer is sometimes omitted. Further, unless the nut is screwed sufficiently far to compress the spring washer, the spring washer is useless.

Proposals have also been made to form on the nut partially severed segments or portions which in some cases have been distorted inwardly so as to exert a grip upon the thread of the stem. Further, a proposal has been made to construct a nut with a partially severed segment at the end which is bent away from the body of the nut. When a nut of this kind is screwed into position, the segment has the effect of forcing the lower side of the thread in the body of the nut into pressure contact with the upper side of the thread of the stem (assuming that the nut is above the work), and when the nut is screwed up against the work, the reaction produced relieves this pressure, and some pressure may be produced, if the nut is screwed tightly enough, between the upper side of the thread in the nut and the lower side of the thread on the stem. Such pressure, however, will be opposed by the pressure produced by the segment.

The object of the present invention is to provide a nut which without the aid of positive locking means and without the aid of a separate member, such as a spring washer, will retain its position upon a threaded stem when subject to prolonged vibration irrespective of whether it has been screwed up tightly or not. Further, a nut constructed in accordance with the present invention is screwed into position on the threaded stem in the ordinary way and with an ordinary spanner.

A nut constructed in accordance with the present invention has at one end one or more integral segments or portions (hereinafter referred to as segments) each partially severed from the nut body by a slit which extends through the thickness of the wall of the nut and partially around the circumference thereof and to one end of the nut, the thread of the nut extending through said segment or segments which is or are integrally connected to the nut at the end of said segment or segments which leads when the nut is being screwed on to the stem, but are distorted after threading by bending in a direction parallel to the axis towards the body of the nut, whereby when the nut is screwed on to a threaded stem—(a) the trailing segment or segments will be led on to the thread without danger of cross threading, and (b) the axial distortion of the segment or segments will cause the thread in the nut body to press heavily upon that side of the thread on the stem which normally receives the load when the nut is screwed up against the work.

Thus, with a nut constructed in accordance with the present invention, the thread pressure produced by the segment or segments is added to the thread pressure produced by screwing the nut tightly up against the work.

In use a nut constructed in accordance with this invention will retain its position upon a threaded stem even when subject to vibration, without being screwed tightly against the work. If, as is normal, it is screwed tightly against the work, the thread pressure between the nut and the stem is further increased, so that the factor tending to retain the nut against loosening is further increased.

The internal thread in the nut extends both through the body of the nut and through the segment or segments, and is formed before the segment or segments are bent in an axial direction towards the body of the nut.

In practice it is preferred to make the nut thicker or longer than usual so that the main body, excluding the segment or segments, is of the standard thickness or length, the excess thickness or length being used for providing the segment or segments.

Externally the main body may be hexagonal, square or of other shape, and the segment or segments may be externally cylindrical and of a diameter slightly less than the distance across the flat parts of the nut.

Referring to the drawing.

Figure 1:
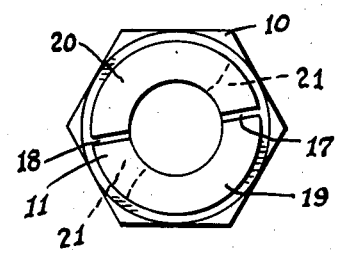
Figure 1 is a plan view showing one construction.
Figure 5:
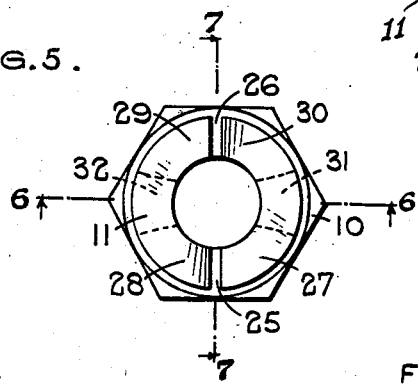
Figure 5 is a plan view thereof.
Figure 6:
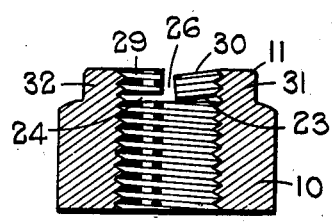
Figure 6 is a sectional view in side elevation upon line 6—6 of Figure 5.
Figure 7:
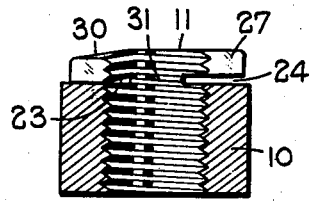
Figure 7 is a sectional view in side elevation upon line 7—7 of Figure 5.
Figures 2, 8:
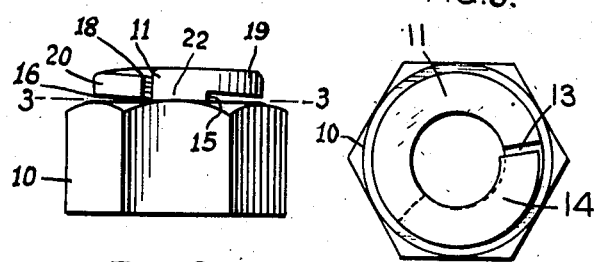
Figure 2 is a view in side elevation of the construction shown in Figure 1.
Figure 8 is a plan view of a nut showing a further modification.
Figure 3:
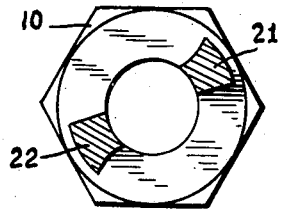
Figure 3 is a sectional plan view on line 3—3 of Figure 2.

In the construction shown in Figures 1, 2 and 3, the body 10 of the nut is provided with a cylindrical extension 11, two separate slits 15 and 16 being cut transversely to the axis and partially severing the extension 11 from the body. These slits may be cut at right angles to the axis of the nut.

Two further slits 17 and 18 are cut parallel to the axis, the slit 17 being at one end of the slit 15, and the slit 18 being at one end of the slit 16, so that two partially severed segments 19 and 20 are formed which are integrally adjoined to the body of the nut at their leading ends in the direction of rotation, but severed from the body of the nut and from the remainder of the extension at their trailing ends.

When the slits 17 and 18 have been made, the nut is placed in a press and the segments 19 and 20 are pressed down towards the body of the nut so that the free end of each is in contact with, or approaches, the top of the nut body. After the pressing operation has been completed, both segments 19 and 20 are inclined to the plane of the top of the nut. The parts 21 and 22 are the integral connecting portions between the partially severed segments and the body of the nut.

Figure 4:
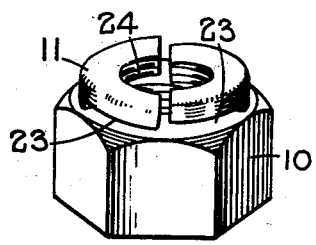
Figure 4 is a perspective view showing a further construction.

In the construction shown in Figure 4, the nut body 10 and extension 11 are formed as before, and in this construction two slits are made transversely to the axis between the extension 11 and the body 10. These slits are shown at 23 and 24.

Two further slits 25 and 26 are made parallel to the axis, the slit 25 being situated intermediate the ends of the slit 23, and the slit 26 being intermediate the ends of the slit 24.

In this way four partially severed segments are formed, these segments being shown at 27, 28, 29 and 30.

The segments 28 and 30 are connected integrally to the body of the nut at their leading ends in the direction of rotation when screwing up, while the segments 27 and 29 are connected integrally to the body of the nut at their trailing ends in the direction of rotation.

The integral connecting portions are shown at 31 and 32.

The segments 28 and 30 are then pressed downwardly towards the body of the nut so that their trailing ends are nearer to the body of the nut than their leading ends. In the construction illustrated the segments 27 and 29 are not bent in an axial direction at all.

In both the constructions the screw thread which is made in the nut prior to the distortion of the partially severed segments extends both through the body and the segments.

In addition to bending the segment or segments downwardly towards the body of the nut, one or more of the segments may be bent inwardly towards the axis. This may be effected by applying pressure to the free end of the segment. Such an arrangement is shown in Figure 8.

When any of these nuts is screwed on to a threaded stem, the threads in the distorted segments are led on to the thread of the stem without danger of cross threading, since at the leading end of each distorted segment, the thread is not out of phase with the thread in the body. When the segment or each segment is bent down towards the body, the pressure is applied at or near its free end, so that while the thread in the segment remains in phase with the thread in the nut body at the leading end, it is definitely out of phase at the following end, and the extent to which it is out of phase increases progressively along the circumferential length of the segment towards its free end.

The act of screwing the nut on the stem, however, moves the distorted segments towards or into their original undistorted positions, and the said segments act as springs operating in an axial direction and tending to pull the body of the nut upwardly (assuming that the nut is being screwed downwardly on the stem), so that the upper sides of the threads in the body of the nut exert considerable force on the lower sides of the threads on the stem. Thus, if the nut is not screwed up tightly against the work, considerable load is applied in an axial direction between the thread in the nut and the thread on the stem, sufficient to ensure that the nut will retain its position on the stem even when subject to vibration.

If the nut is screwed up tightly against the work, then the additional load on the thread thus produced operates in the same direction as the load on the threads produced by the distorted segments.

What I claim then is:

1. A nut having a body of ordinary form and thickness, an integral cylindrical extension at one end, the extension being partially severed from the body by a pair of oppositely disposed slits arranged transversely to the axis of the nut, the two ends of each slit being arranged in converging relationship and substantially radially to the axis of the nut, one end of each slit being disposed in line with the opposite end of the other slit, the extension having a further slit substantially parallel with the axis of the nut, this further slit connecting opposite ends of the two transverse slits with the end of the extension, whereby two similar and oppositely disposed partially severed segments are formed, these segments being each connected at one end to the body of the nut, the bore of the nut being threaded through the body and the segments, said connected ends of the segments being oppositely disposed and situated in each case at the end of the segment which leads when the nut is screwed on to a stem, and the segments being bent towards the body of the nut.

2. A nut having a body of ordinary form and thickness, an integral cylindrical extension at one end, the extension being partially severed from the body by a pair of oppositely disposed slits arranged transversely to the axis of the nut, the two ends of each slit being arranged in converging relationship and substantially radially to the axis of the nut, one end of each slit being disposed in line with the opposite end of the other slit, the extension having a further slit substantially parallel with the axis of the nut, this further slit connecting opposite ends of the two transverse slits with the end of the extension, whereby two similar and oppositely disposed partially severed segments are formed, these segments being each connected at one end to the body of the nut, the bore of the nut being threaded through the body and the segments, said connected ends of the segments being oppositely disposed and situated in each case at the end of the segment which leads when the nut is screwed on to a stem, the segments being bent towards the body of the nut and inwardly towards the axis of the nut.

3. A nut having a body of ordinary form and thickness, an integral extension at one end, the extension being partially severed from the body by a pair of oppositely disposed slits arranged transversely to the axis of the nut, the two ends of each slit being arranged in converging relationship and substantially radially to the axis of the nut, one end of each slit being disposed in line with the opposite end of the other slit, the extension having a further slit substantially parallel with the axis of the nut, this further slit connecting opposite ends of the two transverse slits with the end of the extension, whereby two similar and oppositely disposed partially severed segments are formed, these segments being each connected at one end to the body of the nut, the bore of the nut being threaded through the body and the segments, said connected ends of the segments being oppositely disposed and situated in each case at the end of the segment which leads when the nut is screwed on to a stem, and the segments being bent towards the body of the nut.

4. A nut having a body of ordinary form and thickness, an integral cylindrical extension at one end, the extension being partially severed from the body by a pair of oppositely disposed slits arranged transversely to the axis of the nut, the two ends of each slit being arranged in converging relationship and substantially radially to the axis of the nut, the extension having a further slit substantially parallel with the axis of the nut, this further slit extending diametrically across the end of the extension and communicating with both the transverse slits, whereby two similar and oppositely disposed partially severed segments are formed, these segments being each connected at one end to the body of the nut, the bore of the nut being threaded through the body and the segments, said connected ends of the segments being oppositely disposed and situated in each case at the end of the segment which leads when the nut is screwed on to a stem, and said segments being bent towards the body of the nut.

CHRISTOPHER JOHN WHITCOMBE